Patented July 31, 1923.

1,463,508

UNITED STATES PATENT OFFICE.

BIRGER FJELD HALVORSEN, OF CHRISTIANIA, NORWAY.

PROCESS OF RECOVERING SOLUBLE COMPOUNDS OF POTASSIUM AND ALUMINUM FROM SILICATES.

No Drawing. Application filed March 26, 1921. Serial No. 455,823.

*To all whom it may concern:*

Be it known that I, BIRGER FJELD HALVORSEN, a subject of the King of Norway, residing at Christiania, in the Kingdom of Norway, have invented certain new and useful Improvements in a Process of Recovering Soluble Compounds of Potassium and Aluminum from Silicates (for which I have obtained patents in Norway, No. 27883, application filed May 30th, 1916; Sweden, No. 47044, application filed May 29, 1917; Switzerland, No. 77376, application filed May 26, 1917; France, No. 486,577, application filed June 6, 1917; Italy, application No. 247/773, filed May 29, 1917; Spain, No. 64710, application filed June 8, 1917; Canada, No. 186,421, application filed June 7, 1917; Great Britain, No. 107,012, application filed May 30, 1917); and he does hereby declare the following to be a full, clear, and exact description of the invention, such as will enable others skilled in the art to which it appertains to make and use the same.

This invention has for its object a process of recovering soluble compounds of potassium and aluminum from silicates.

According to the present invention the decomposition by means of calcium cyanamide is carried into effect in a special manner characterized by the combination of the decomposition operation with the process of converting the nitrogen of the cyanamide into ammonia.

This conversion of the cyanamide into ammonia is usually carried into effect on an industrial scale by means of heating the cyanamide in autoclaves in the presence of water. It is also known that it is possible instead of water in autoclaves to use superheated steam at higher temperatures for instance 650° C. and more. It has been found that when alkali-metal aluminum silicate (felspar) in a finely divided condition are added to the cyanamide of calcium previously to the decomposition operation the alkali and the alumina are in part converted into soluble form. What is actually taking place is as will be seen a decomposition by means of lime or carbonate of calcium.

It has also been found that the reaction is facilitated by the addition of salts such as chlorides, nitrates, sulphates, etc.

I claim:

1. The process which consists in heating a mixture of alkali-metal aluminum silicates and cyanamide of calcium in the presence of water.

2. The process which consists in heating a mixture of alkali-metal aluminum silicates and cyanamide of calcium in the presence of water in the form of superheated steam.

3. The process which consists in heating a mixture of alkali-metal aluminum silicates and cyanamide of calcium in the presence of water in the form of superheated steam at temperatures above 650° C.

4. The process which consists in heating a mixture of alkali-metal aluminum silicates and cyanamide of calcium in the presence of water under pressure in a closed vessel and at a temperature above 100° C.

5. The process which consists in heating a mixture of alkali-metal aluminum silicates and cyanamide of calcium in the presence of water and recovering the resulting soluble compounds of potassium and aluminum.

6. The process which consists in heating a mixture of alkali-metal aluminum silicates and cyanamide of calcium in the presence of water and a salt of a mineral acid.

In testimony that I claim the foregoing as my invention, I have signed my name in presence of two subscribing witnesses.

BIRGER FJELD HALVORSEN.

Witnesses:
C. NORMAN.
KARL L. LEE.